United States Patent
Kang et al.

(10) Patent No.: US 6,501,614 B1
(45) Date of Patent: Dec. 31, 2002

(54) ACOUSTIC INSULATOR FOR CONTROLLING NOISE GENERATED IN A MASS STORAGE DEVICE

(75) Inventors: Seong-Woo Kang, Santa Clara, CA (US); Tai-Yeon Hwang, Santa Clara, CA (US); Yun-Sik Han, Santa Clara, CA (US); Wilson Long, San Jose, CA (US)

(73) Assignee: Samsung Electronics Co., Ltd. (KR)

( * ) Notice: Subject to any disclaimer, the term of this patent is extended or adjusted under 35 U.S.C. 154(b) by 100 days.

(21) Appl. No.: 09/585,914

(22) Filed: Jun. 2, 2000

Related U.S. Application Data

(60) Provisional application No. 60/149,932, filed on Aug. 19, 1999.

(51) Int. Cl.[7] .................. G11B 17/028; G11B 5/012
(52) U.S. Cl. ..................................................... 360/97.01
(58) Field of Search ......................... 360/97.01, 97.02, 360/88; 369/263

(56) References Cited

U.S. PATENT DOCUMENTS

| 3,558,831 A | 1/1971 | Prescott et al. ............... 379/436 |
|---|---|---|
| 4,110,802 A | 8/1978 | Ho et al. .................. 360/365.1 |
| 4,280,156 A | 7/1981 | Villette .................... 360/255.6 |
| 4,493,554 A | 1/1985 | Pryor et al. ............... 356/241.1 |
| 4,555,739 A | 11/1985 | Le Van et al. ............. 360/236.1 |
| 4,562,500 A | 12/1985 | Bygdnes .................... 360/256.6 |
| 4,630,926 A | 12/1986 | Tanaka et al. ............... 356/507 |
| 4,661,873 A | 4/1987 | Schulze ..................... 360/254.3 |
| 4,673,996 A | 6/1987 | White ....................... 360/236.7 |
| 4,703,376 A | 10/1987 | Edwards et al. ............. 360/254.3 |
| 4,731,777 A | 3/1988 | Yoshitoshi et al. ........... 369/263 |
| 4,739,425 A | 4/1988 | Dierkes et al. .............. 360/98.08 |
| 4,784,012 A | 11/1988 | Marra ....................... 74/573 R |
| 4,794,588 A | 12/1988 | Yoshitoshi et al. ........... 369/263 |
| 4,802,042 A | 1/1989 | Strom ....................... 360/236.3 |
| 4,819,105 A | 4/1989 | Edwards .................... 360/98.08 |
| 4,839,756 A | 6/1989 | Chew et al. ................ 360/254.3 |
| 4,866,553 A | 9/1989 | Kubo et al. .................. 356/507 |
| 4,870,519 A | 9/1989 | White ....................... 360/236.7 |
| 4,890,172 A | 12/1989 | Watt et al. ................. 360/77.04 |
| 4,949,206 A | 8/1990 | Phillips et al. ............. 360/265.1 |
| 4,958,337 A | 9/1990 | Yamanaka et al. ........... 369/53.36 |
| 4,982,300 A | 1/1991 | Forbord .................... 360/264.7 |

(List continued on next page.)

FOREIGN PATENT DOCUMENTS

| EP | 0 426 353 A2 | 5/1991 |
|---|---|---|
| EP | 0 463 752 A2 | 1/1992 |
| EP | 0 491 563 A2 | 6/1992 |
| EP | 0 582 464 A2 | 2/1994 |
| EP | 0 801 387 A2 | 10/1997 |
| GB | 2 326 755 A | 12/1998 |
| JP | 632 344 55 | 9/1988 |
| JP | 3-83281 | 4/1991 |
| JP | 3-104079 | 5/1991 |
| JP | 4-232685 A * | 8/1992 |
| JP | 09251769 A | 9/1997 |
| JP | 9-293370 | 11/1997 |
| WO | WO 96/34390 | 10/1996 |

OTHER PUBLICATIONS

US 6,091,569, 7/2000, Allsup et al. (withdrawn)

*Primary Examiner*—Hoa T. Nguyen
*Assistant Examiner*—Julie Anne Watko
(74) *Attorney, Agent, or Firm*—Irell & Manella, LLP; Jeffrey P. Aiello

(57) ABSTRACT

A hard disk drive which has a housing that can attenuate noise. The housing may include a first layer that is attached to a second layer and a third layer located between the first and second layers. The layers may be designed to create a transfer function that attenuates, or rolls off, acoustic noise within a range of frequencies.

17 Claims, 2 Drawing Sheets

U.S. PATENT DOCUMENTS

| | | | |
|---|---|---|---|
| 5,004,207 A | 4/1991 | Ishikawa et al. | 248/632 |
| 5,021,905 A | 6/1991 | Sleger | 360/97.02 |
| 5,029,026 A | 7/1991 | Stefansky et al. | 360/97.02 |
| 5,062,017 A | 10/1991 | Strom et al. | 360/236.3 |
| 5,097,370 A | 3/1992 | Hsia | 360/236.1 |
| 5,128,822 A | 7/1992 | Chapin et al. | 360/236.3 |
| 5,130,870 A | 7/1992 | Jabbari | 360/99.08 |
| 5,159,508 A | 10/1992 | Grill et al. | 360/235.2 |
| 5,161,900 A | 11/1992 | Bougathou et al. | 384/133 |
| 5,167,167 A | 12/1992 | Tiernan, Jr. et al. | 74/573 R |
| 5,175,661 A | 12/1992 | Mizuno et al. | 360/132 |
| 5,187,621 A | 2/1993 | Tacklind | 360/97.02 |
| 5,200,868 A | 4/1993 | Chapin et al. | 360/236.1 |
| 5,202,803 A | 4/1993 | Albrecht et al. | 360/97.02 |
| 5,214,549 A * | 5/1993 | Baker et al. | 360/97.01 |
| 5,241,438 A | 8/1993 | Matsushima | 360/236.1 |
| 5,243,495 A | 9/1993 | Read et al. | 360/97.02 |
| 5,247,493 A | 9/1993 | Kime et al. | 369/13.17 |
| 5,262,911 A | 11/1993 | Cain et al. | 360/244.6 |
| 5,262,913 A | 11/1993 | Stram et al. | 360/265.1 |
| 5,267,109 A | 11/1993 | Chapin et al. | 360/236.5 |
| 5,274,519 A | 12/1993 | Saito et al. | 360/254.3 |
| 5,287,235 A | 2/1994 | Cunningham et al. | 360/236.9 |
| 5,293,282 A | 3/1994 | Squires et al. | 360/77.08 |
| 5,309,303 A | 5/1994 | Hsia et al. | 360/236.1 |
| 5,319,511 A | 6/1994 | Lin | 360/256.1 |
| 5,343,343 A | 8/1994 | Chapin | 360/236.1 |
| 5,347,414 A | 9/1994 | Kano | 360/254.4 |
| 5,365,389 A | 11/1994 | Jabbari et al. | 360/265.1 |
| 5,369,538 A | 11/1994 | Moe et al. | 360/265.1 |
| 5,396,386 A | 3/1995 | Bolasna et al. | 360/236.1 |
| 5,396,387 A | 3/1995 | Murray | 360/236.8 |
| 5,402,290 A | 3/1995 | Daniel | 360/265.1 |
| 5,404,256 A | 4/1995 | White | 360/236.3 |
| 5,410,402 A | 4/1995 | Li et al. | 356/243.3 |
| 5,422,776 A | 6/1995 | Thorson et al. | 360/98.07 |
| 5,426,562 A | 6/1995 | Morehouse et al. | 361/685 |
| 5,442,638 A | 8/1995 | Awad et al. | 714/6 |
| 5,455,728 A | 10/1995 | Edwards et al. | 360/256.2 |
| 5,460,017 A | 10/1995 | Taylor | 68/23.2 |
| 5,463,527 A | 10/1995 | Hager et al. | 361/685 |
| 5,469,311 A | 11/1995 | Nishida et al. | 360/97.02 |
| 5,537,272 A | 7/1996 | Kazmierczak et al. | 360/99.08 |
| 5,546,250 A | 8/1996 | Diel | 360/97.02 |
| 5,555,144 A | 9/1996 | Wood et al. | 360/98.08 |
| 5,570,249 A | 10/1996 | Aoyagi et al. | 360/244.2 |
| 5,610,776 A | 3/1997 | Oh | 360/53 |
| 5,636,090 A | 6/1997 | Boigenzahn et al. | 360/256.4 |
| 5,663,853 A | 9/1997 | Park | 360/236.4 |
| 5,666,239 A * | 9/1997 | Pottebaum | 360/97.03 |
| 5,673,158 A | 9/1997 | Ichimura | 360/97.01 |
| 5,677,813 A | 10/1997 | Yoshida et al. | 360/97.02 |
| 5,703,734 A | 12/1997 | Berberich et al. | 360/97.02 |
| 5,754,353 A | 5/1998 | Behrens et al. | 360/53 |
| 5,768,249 A | 6/1998 | Ro et al. | 369/263 |
| 5,781,373 A | 7/1998 | Larson et al. | 360/97.02 |
| 5,801,899 A | 9/1998 | Genheimer | 360/97.01 |
| 5,815,349 A | 9/1998 | Frater | 360/245.7 |
| 5,822,139 A | 10/1998 | Ayabe | 360/31 |
| 5,831,795 A | 11/1998 | Ma et al. | 360/254.3 |
| 5,844,754 A | 12/1998 | Stefansky et al. | 360/266.1 |
| 5,844,911 A | 12/1998 | Schadegg et al. | 714/710 |
| 5,875,067 A | 2/1999 | Morris et al. | 360/97.01 |
| 5,885,005 A | 3/1999 | Nakano et al. | 384/113 |
| 5,886,851 A | 3/1999 | Yamazaki et al. | 360/97.02 |
| 5,901,017 A | 5/1999 | Sano et al. | 360/245.9 |
| 5,926,347 A | 7/1999 | Kouhei et al. | 360/254.3 |
| 5,930,079 A | 7/1999 | Vera et al. | 360/245.7 |
| 5,930,080 A | 7/1999 | Frater et al. | 360/234.5 |
| 5,936,927 A | 8/1999 | Soga et al. | 369/75.1 |
| 5,969,901 A | 10/1999 | Eckberg et al. | 361/97.01 |
| 5,982,580 A * | 11/1999 | Woldemar et al. | 360/97.01 |
| 5,987,733 A | 11/1999 | Goss | 29/603.3 |
| 6,011,670 A | 1/2000 | Balsley, Jr. et al. | 360/97.01 |
| 6,034,941 A | 3/2000 | Ro | 369/263 |
| 6,046,883 A | 4/2000 | Miller | 360/245.7 |
| 6,084,744 A | 7/2000 | Genheimer et al. | 360/97.02 |
| 6,088,192 A | 7/2000 | Riener et al. | 360/266.1 |
| 6,088,194 A | 7/2000 | Imaino et al. | 360/294.3 |
| 6,088,202 A | 7/2000 | Kabasawa et al. | 360/245.7 |
| 6,154,360 A | 11/2000 | Kaczeus, Sr. et al. | 361/685 |
| 6,157,522 A | 12/2000 | Murphy et al. | 360/294.6 |
| 6,166,901 A | 12/2000 | Gamble et al. | 361/685 |
| 6,177,173 B1 * | 1/2001 | Nelson | 156/250 |
| 6,185,075 B1 | 2/2001 | Tsujino et al. | 360/265.7 |
| 6,185,807 B1 | 2/2001 | Kazmierczak et al. | 29/450 |
| 6,198,606 B1 | 3/2001 | Boutaghou et al. | 360/294.3 |
| 6,201,668 B1 | 3/2001 | Murphy | 360/294.4 |
| 6,205,005 B1 | 3/2001 | Heath | 360/266.1 |
| 6,226,143 B1 | 5/2001 | Stefansky | 360/97.01 |
| 6,226,152 B1 | 5/2001 | Tanaka et al. | 360/244.6 |
| 6,229,668 B1 | 5/2001 | Huynh et al. | 360/97.01 |
| 6,233,124 B1 | 5/2001 | Budde et al. | 360/294.4 |
| 6,239,943 B1 | 5/2001 | Jennings et al. | 360/97.02 |
| 6,366,426 B1 * | 4/2002 | Beatty et al. | 360/135 |

* cited by examiner

ACOUSTIC INSULATOR FOR CONTROLLING NOISE GENERATED IN A MASS STORAGE DEVICE

CROSS-REFERENCE TO RELATED APPLICATION

The present application claims benefit of U.S. Provisional Application No. 60/149,932, filed Aug. 19, 1999.

FIELD OF THE INVENTION

The present invention relates to a hard disk drive that has a laminated housing which attenuates noise generated by the drive.

PRIOR ART

Hard disk drives contain a plurality of transducers that are coupled to magnetic disks. The transducers can read and write information by magnetizing and sensing the magnetic fields of the disks, respectively. The disks are rotated by a spindle motor that is mounted to a base plate.

The transducers are typically integrated into heads that are mounted to corresponding flexure arms. The flexure arms are attached to an actuator arm that is mounted to the base plate. The actuator arm includes a voice coil motor that can move the transducers across the surfaces of the disks. The voice coil motor allows the transducers to access information located within different radial tracks of the disks. The disks, spindle motor and actuator arm are all enclosed by a cover that is attached to the base plate.

The spindle motor and voice coil motor generate acoustic noise that is transmitted into the environment through the cover and the base plate of the drive. The spindle motor may also create vibration that is converted into acoustic noise and emitted by the disk drive. Additionally, the rotating disks create a flow of air that may generate fluid perturbations and resultant acoustic noise.

Acoustic noise is undesirable particularly when the disk drive is assembled into a consumer product such as a computer or a digital video recorder. It would therefore be desirable to provide a hard disk drive that attenuates the noise generated by the drive. It would be desirable to attenuate the noise without significantly increasing the size of the hard disk drive or the cost of producing the drive.

BRIEF SUMMARY OF THE INVENTION

One embodiment of the present invention is a hard disk drive which has a housing that can attenuate noise. The housing may include a first layer that is attached to a second layer and a third layer located between the first and second layers.

DETAILED DESCRIPTION OF THE INVENTION

In general the present invention provides a disk drive housing that can attenuate noise generated within the drive. The housing may be constructed to significantly attenuate, or roll off, noise within a certain range of frequencies. The housing construction may include one or more dissimilar materials of varying density selected to provide a transfer function that will attenuate the desired range of noise frequencies.

Figure 1:
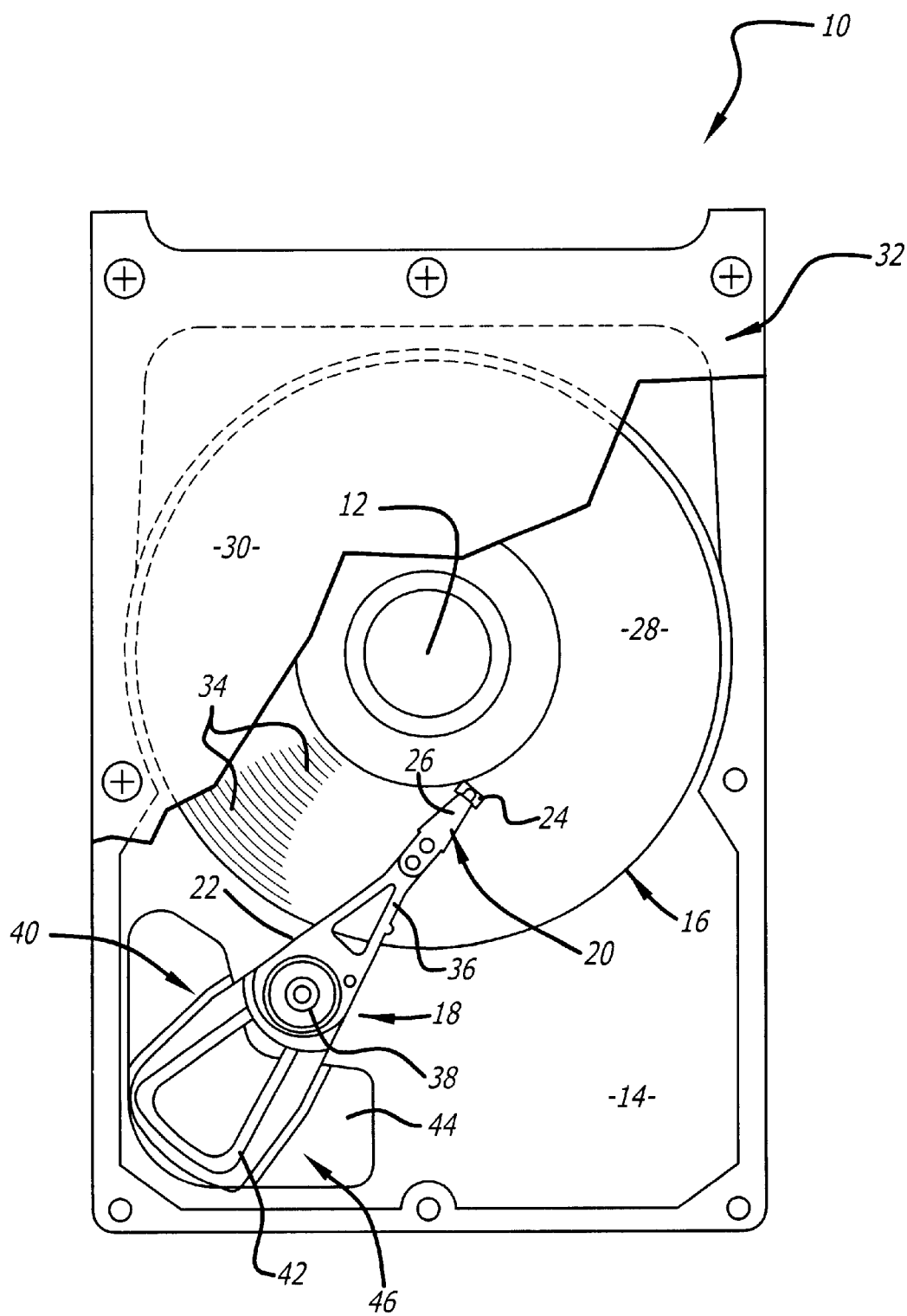
FIG. 1 is a top sectional view of an embodiment of a hard disk drive of the present invention.

Referring to the drawings more particularly by reference numbers, FIG. 1 shows an embodiment of a hard disk drive of the present invention. The disk drive 10 may include a spindle motor 12 that is mounted to a base plate 14. The spindle motor 12 rotates a plurality of disks 16. The disks 16 rotate relative to an actuator arm assembly 18. The actuator arm assembly 18 includes a plurality of head gimbal assemblies 20 that are attached to an actuator arm 22. Each head gimbal assembly 20 may include a head 24 that is gimbal mounted to a suspension arm 26. Each head 24 is magnetically coupled to a disk surface 28. The disks 16 and actuator arm assembly 18 may be enclosed by a cover plate 30 that is attached to the base plate 14. The cover 30 and base 14 plates form a disk drive housing 32.

Each head 24 may include a write element (not shown) and a read element (not shown) that are coupled to an electronic circuit(s) (not shown). The circuit and read/write elements can magnetize and sense the magnetic field of each disk surface 28 to store and retrieve data within the disk drive. The data is typically stored within sectors that extend along annular tracks 34 of the disks 16. Each head 24 typically includes an air bearing surface that cooperates with an air flow created by the rotating disks 16 to create an air bearing between the head 24 and the disk surface 28. The air bearing prevents contact and wear between the disks 16 and the heads 24.

The actuator arm 22 may include a plurality of individual arms 36 that are separated by slots (not shown) which allow the disks 16 to spin between the arms 36. The actuator arm 22 may be pivotally mounted to the base plate 14 by a bearing assembly 38.

The actuator arm 22 may further have a voice coil portion 40 that supports a voice coil 42. The voice coil 42 may be coupled to a magnet assembly 44 and a driver circuit (not shown). The coil 42 and magnet assembly 44 are commonly referred to as a voice coil motor 46. When excited by the driver circuit the voice coil 42 cooperates with the magnet assembly 44 to create a torque that rotates the actuator arm 22 relative to the base plate 14. The pivotal movement of the actuator arm 22 moves the heads 24 across the disk surfaces 28 to access different tracks of the disks 16.

The disk drive 10 may generate acoustic noise that is transmitted into the housing 32. In particular, the spindle motor 12 and voice coil motor 46 may generate noise that is transmitted into the housing 32. Additionally, mechanical vibration from the spindle motor 12 may be transferred into the housing 32 and produce an audible sound from the housing structure. Furthermore, the rotating disks 16 may create fluid perturbations that cause the housing to vibrate and emit an audible sound.

Figure 2:
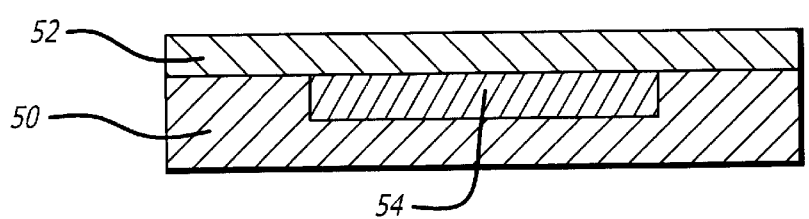
FIG. 2 is a side sectional view of the housing.

As shown in FIG. 2, the housing 32 may include a laminate construction designed to attenuate the noise generated by the disk drive 10. The housing 32 may be constructed to attenuate a certain band of frequencies in the acoustic range. The housing 32, including the cover 30 and/or the base plate 12, may include a first layer 50 that is attached to a second layer 52 and a third layer 54 that is attached to the first 50 and second 52 layers. The different layers may be constructed from dissimilar materials that each have a different mass density.

By way of example, the first layer 50 may be constructed from aluminum, the second 52 and third 54 layers may be constructed from stainless steel. Stainless steel has a higher mass density than aluminum. Alternatively, the second layer 52 may be constructed from stainless steel and the third layer 54 may be constructed from brass or aluminum. The layers 50, 52 and 54 may be attached together by an adhesive or other attachment means. The layers 50, 52 and 54 can be formed in the cover 30 and/or base plate 14.

The materials and dimensions of the different layers, particularly the second 52 and third 54 layers may be designed to create a transfer function that attenuates, or rolls of, a certain frequency band of acoustic noise. By way of example, the layers 50, 52 and 54 may be constructed to attenuate low frequency noise around 1 kHz to 3 kHz, noise typically generated by a hard disk drive 10 and is sensitive to human ears. The present invention therefore provides a structure and design technique for attenuating noise without increasing, or significantly increasing, the thickness of the disk drive.

Figure 3:
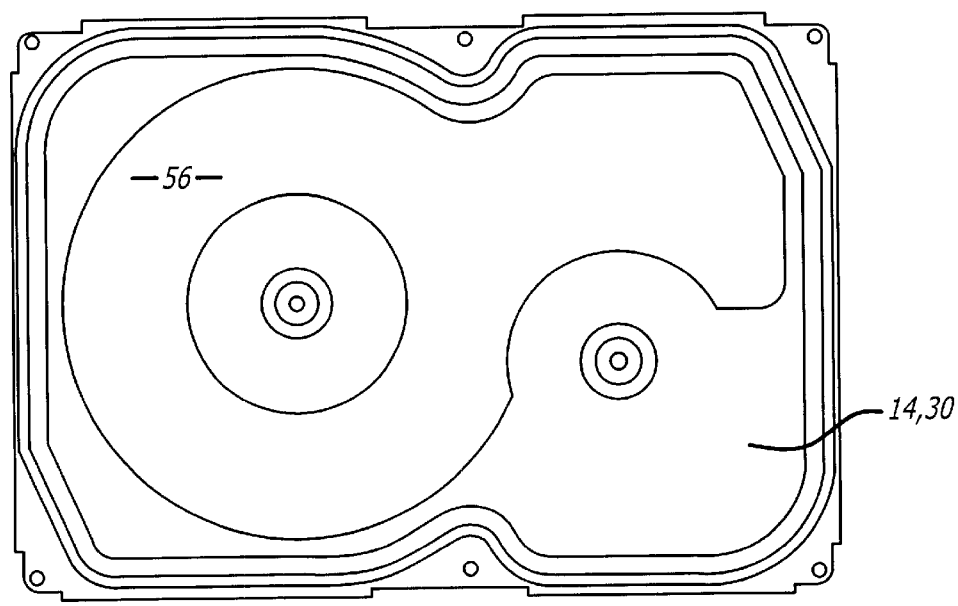
FIG. 3 is a top sectional view of a cover plate assembly of the hard disk drive.
Figure 4:
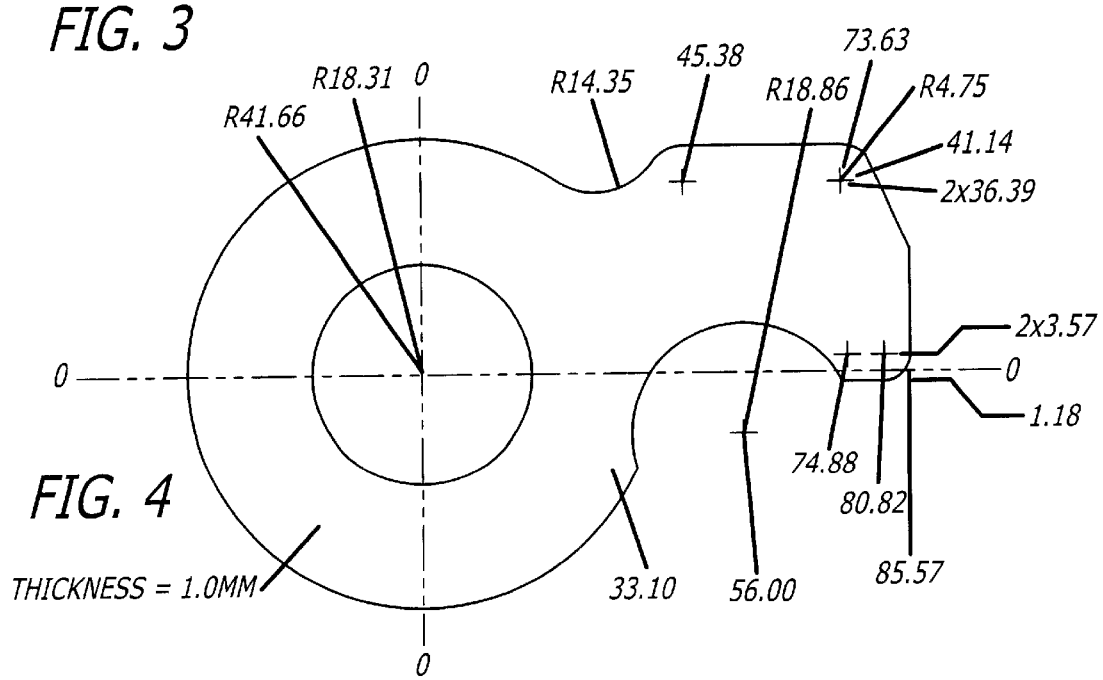
FIG. 4 is a top view of a specific embodiment of a plate shown in FIG. 3.

FIG. 3 shows an embodiment of a disk drive wherein the second layer 52 is constructed as a plate 56 that extends from an area adjacent to the disks to an area adjacent to the voice coil motor, elements that both generate acoustic noise. FIG. 4 provides a specific example of a brass plate 56 that can be provided to attenuate noise in the range of 1 kHz to 3 kHz. It being understood that other materials and dimensions can be used to attenuate noise in a different range of frequencies. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A housing for a disk drive, comprising:
    a first metal layer that has a first density;
    a second metal layer that is attached to said first layer; and
    a third metal layer that is located between said first and second layers, said first, second and third layers create a transfer function that attenuates noise between 1000 to 3000 hertz.

2. The housing of claim 1, wherein said third layer has a mass density different from a mass density of said first layer.

3. The housing of claim 1, wherein said second layer has a mass density different than the mass density of said first layer.

4. The housing of claim 1, wherein said third layer is attached to said first and second layers.

5. The housing of claim 1, wherein said first layer is constructed from aluminum.

6. The housing of claim 5, wherein said second layer is constructed from steel.

7. The housing of claim 5, wherein said third layer is constructed from brass.

8. A disk drive, comprising:
    a base plate;
    a spindle motor mounted to said base plate;
    a disk attached to said spindle motor;
    an actuator arm mounted to said base plate;
    a transducer that is coupled to said actuator arm and said disk; and,
    a cover attached to said base plate, said cover including a first metal layer, a second metal layer that is attached to said first layer, and a third metal layer that is located between said first and second layers, said first, second and third layers create a transfer function that attenuates noise between 1000 to 3000 hertz.

9. The disk drive of claim 8, wherein said third layer has a mass density different from a mass density of first layer.

10. The disk drive of claim 8, wherein said second layer has a mass density different from the mass density of said first layer.

11. The disk drive of claim 8, wherein said third layer is attached to said first layer.

12. The disk drive of claim 8, wherein said first layer is constructed from aluminum.

13. The disk drive of claim 12, wherein said second layer is constructed from steel.

14. The disk drive of claim 12, wherein said third layer is constructed from brass.

15. The disk drive of claim 8, wherein said second layer is a plate that extends from an area adjacent to said disk to an area adjacent to said actuator arm assembly.

16. A method for designing a housing of a disk drive, comprising:
    selecting a first metal layer;
    selecting a second metal layer that is to be attached to the first layer; and,
    selecting a third layer that is to be located between the first and second metal layers, said first, second and third layers create a transfer function that attenuates noise between 1000 to 3000 hertz.

17. The method of claim 16, wherein the first, second and third layers have different mass densities.

* * * * *